United States Patent [19]

Ferguson

[11] Patent Number: 4,703,192

[45] Date of Patent: Oct. 27, 1987

[54] ALTERNATING CURRENT POWER SOURCE WITH IMPROVED PHASE ADJUSTING CAPABILITY

[75] Inventor: Frank T. Ferguson, Oklahoma City, Okla.

[73] Assignee: Control Technology, Inc., Oklahoma City, Okla.

[21] Appl. No.: 776,032

[22] Filed: Sep. 13, 1985

Related U.S. Application Data

[63] Continuation-in-part of Ser. No. 564,495, Dec. 22, 1983, Pat. No. 4,560,886.

[51] Int. Cl.[4] .............................................. H02J 9/06
[52] U.S. Cl. ...................................... 307/64; 307/66; 307/87
[58] Field of Search ...................... 307/64, 65, 66, 87; 363/41, 71, 90, DIG. 1

[56] References Cited

U.S. PATENT DOCUMENTS

| | | | |
|---|---|---|---|
| 3,337,743 | 8/1967 | Rolfes | 307/66 |
| 3,389,268 | 6/1968 | Jamieson et al. | 307/66 |
| 4,038,559 | 7/1977 | Chun et al. | |
| 4,048,552 | 9/1977 | Stone | |
| 4,099,066 | 7/1978 | Beggs | |
| 4,109,161 | 8/1978 | Iijima | |
| 4,122,359 | 10/1978 | Breikss | |
| 4,143,283 | 3/1979 | Graf et al. | |
| 4,167,680 | 9/1979 | Gross | |
| 4,277,692 | 7/1981 | Small | |
| 4,315,162 | 2/1982 | Ferguson | |
| 4,362,951 | 12/1982 | Turner et al. | |
| 4,384,214 | 5/1983 | Crick et al. | |
| 4,400,625 | 8/1983 | Hussey | |
| 4,471,422 | 9/1984 | Hierholzer, Jr. | 363/71 X |

*Primary Examiner*—William M. Shoop, Jr.
*Assistant Examiner*—Richard K. Blum
*Attorney, Agent, or Firm*—Laney, Dougherty, Hessin & Beavers

[57] ABSTRACT

An alternating current power source, which is to provide an auxiliary alternating power signal output to a load after switchover from a primary power signal, includes a phase switching circuit which causes the auxiliary power signal to immediately switch phases when a phase imbalance is detected between the primary power signal which existed immediately prior to switchover and the reserve power signal which exists immediately after switchover. In a preferred embodiment the circuit includes a diode and capacitor serially connected between a shutdown output and a synchronizing input of a pulse width modulator integrated circuit.

14 Claims, 11 Drawing Figures

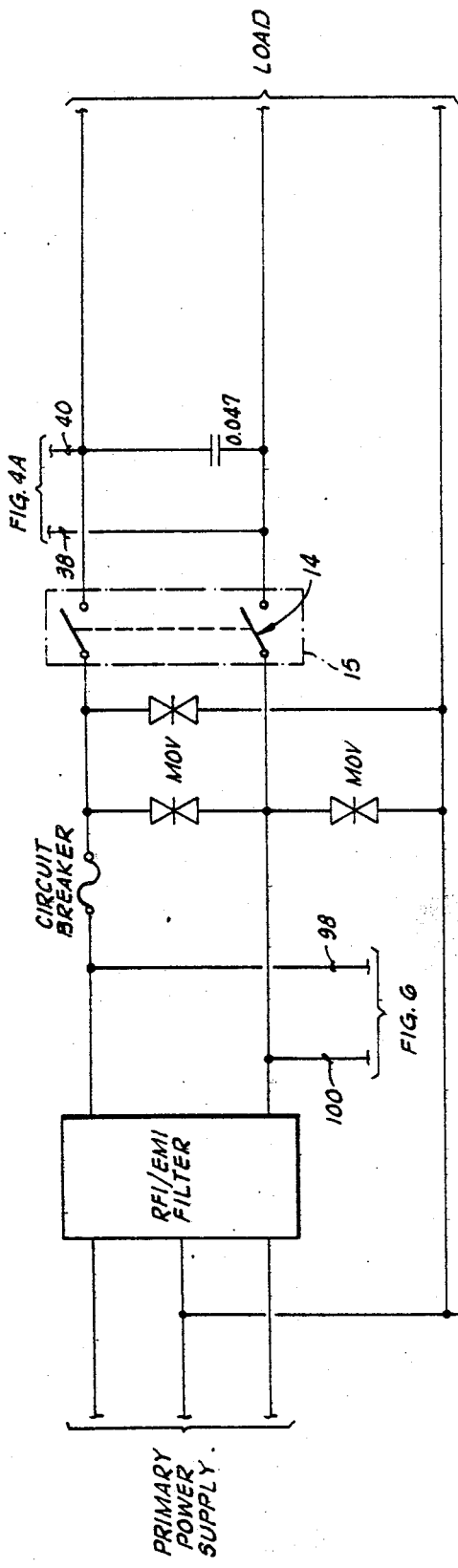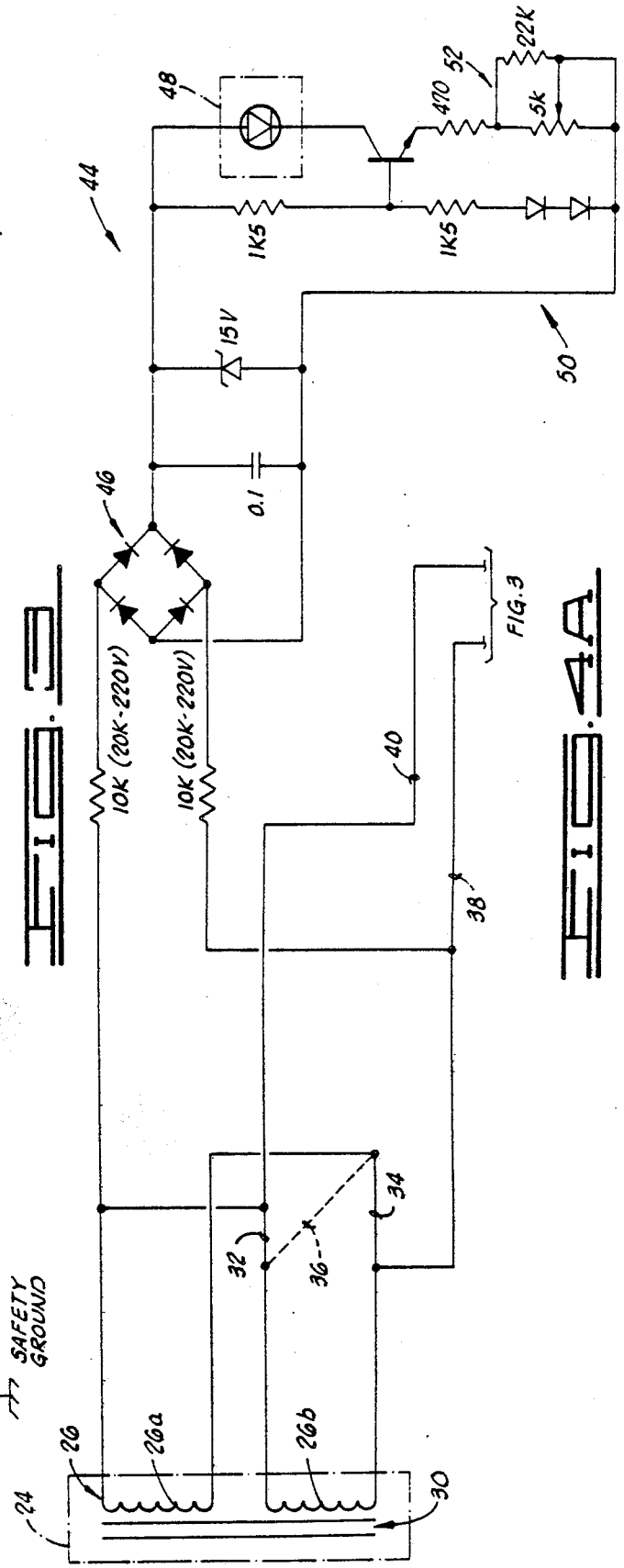

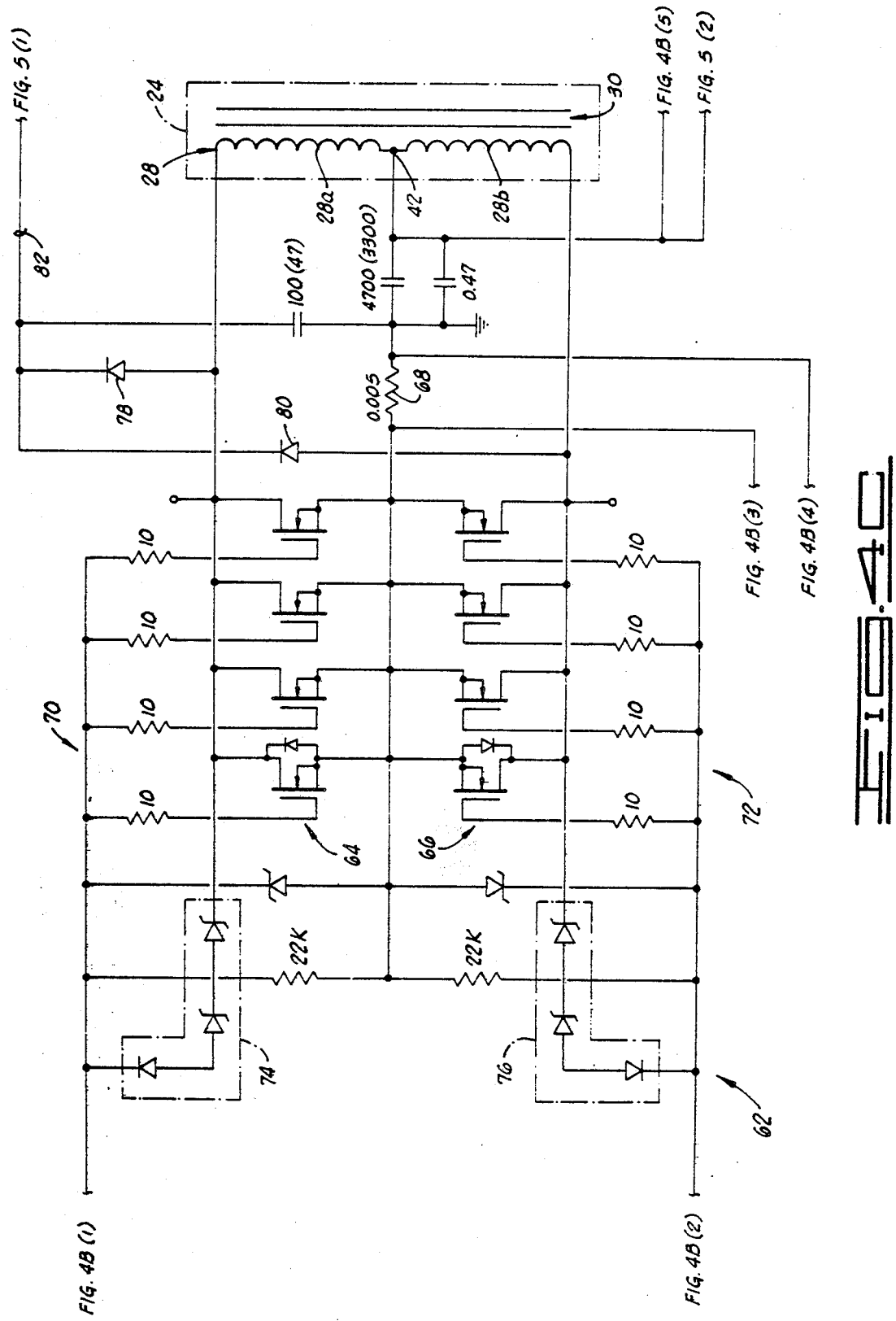

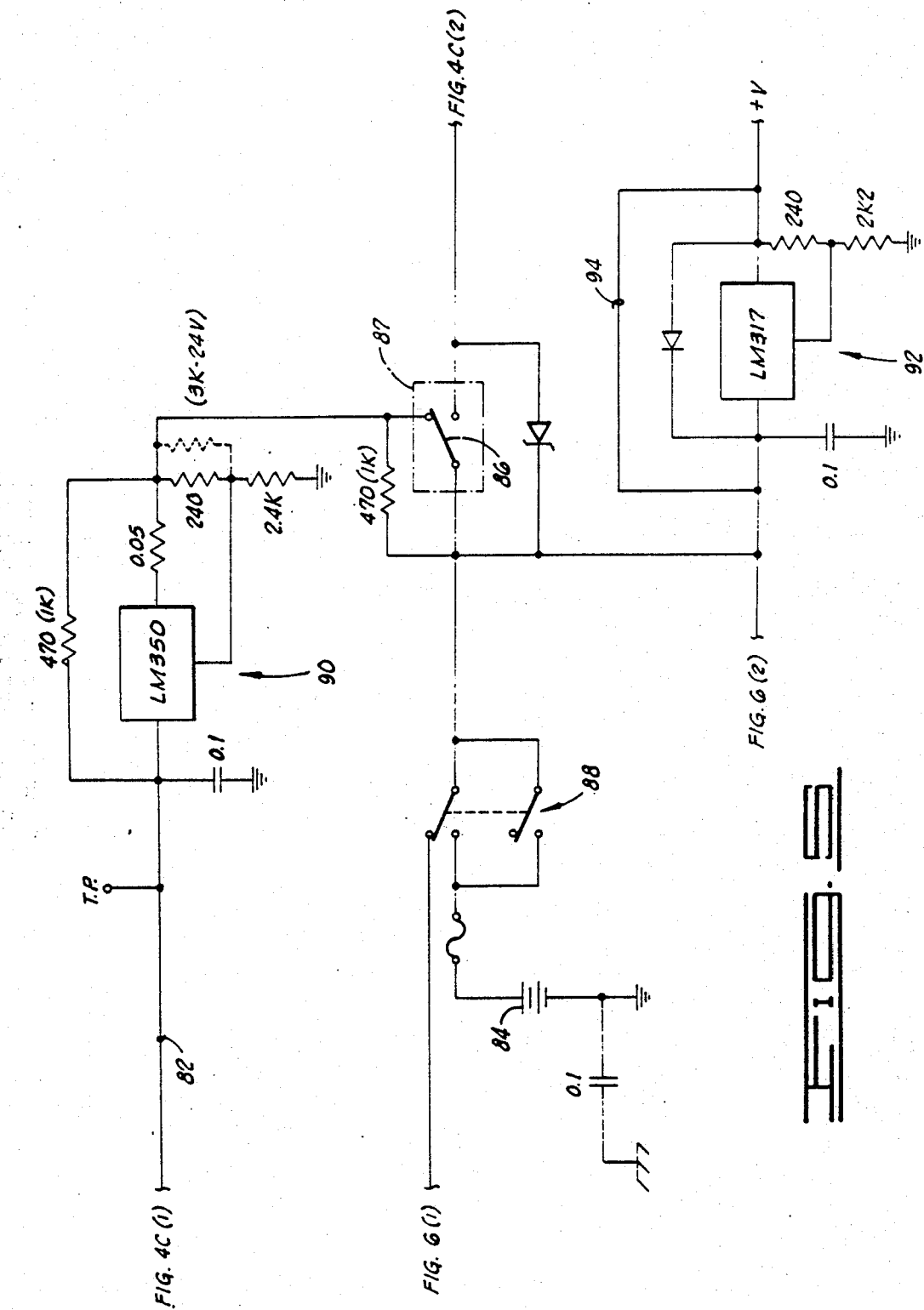

ALTERNATING CURRENT POWER SOURCE WITH IMPROVED PHASE ADJUSTING CAPABILITY

CROSS-REFERENCE TO RELATED APPLICATION

This application is a continuation-in-part of U.S. patent application Ser. No. 564,495, entitled Alternating Current Power Source and filed Dec. 22, 1983, now U.S. Pat. No. 4,560,886.

BACKGROUND OF THE INVENTION

This invention relates generally to alternating current power sources and more particularly, but not by way of limitation, to a reserve alternating current power supply for a computer.

To power electrical devices there is the need for some source of power. Quite frequently, the power is to be of the alternating current (AC) type rather than the direct current (DC) type. Although the electrical device might ultimately require DC power, such DC power can be obtained from an AC power source, such as by a rectification process as known to the art. Therefore, there is the general need for an alternating current power source.

By way of a specific example, an electronic computer needs to be energized by some type of power source. Although components of the computer might ultimately require DC power, AC power is frequently used as the primary source from which the DC power can be derived. Therefore, in energizing an electronic computer, the commercial AC power supply obtained from a wall socket or the like is frequently used. However, because the commercial AC power supply is susceptible to power interruptions, such as outages or brown-outs, there is the further need for a second alternating current power source which can function as a back-up to the commercial supply or, alternatively, as the primary supply if so desired. That this need has arisen is indicated in U.S. Pat. No. 4,038,559 to Chun et al. which discloses a system having two alternating current power sources and which also discloses other prior art techniques.

Regardless of the specific use of such an alternating current power source, there is the need that such a power source properly control its power output by monitoring the power output.

When functioning in a reserve mode, such a power source should automatically detect power interruptions and apply its power to prevent damage to or improper operation of the electrical load being powered.

Such a power source functioning in a reserve mode should also automatically monitor and reconnect the primary power source to the load when the primary power source returns to proper operation. Disconnection of the reserve power source should also be performed by the power source once the primary source has been reconnected.

To insure that the reserve power source will be available when a primary power interruption occurs, the reserve power source should have the capability of being recharged by the primary power source when the primary power source is operating properly.

Indications perceptible to an operator should also be provided by such a power source so that the present operating status can be quickly determined.

When such a power source is functioning in a reserve mode, it is also desirable that, at the time of switchover from the primary power supply to the reserve power source, the phase relationship between the two power signals provided by the primary power supply and the reserve power source be properly maintained. If an improper phase relationship is not properly adjusted, a transformer used in the reserve power source or a transformer on the input of the load can saturate due to the resultant flux imbalance. Saturation causes the reserve power source to improperly operate.

This desirable goal of maintaining a proper phase relationship has been recognized in the prior art. For example, large inductors have been used in transformer circuits to slow current rise times in an attempt to preclude saturation current from being applied to the transformers. This proposal has shown a significant failure rate. Additionally, excessively rated output devices or large transformers have been used; however, this is relatively expensive. Another expensive proposal has been to use elaborate circuits to monitor the primary power signal from the primary supply so that the reserve power source can be switched in at the proper phase relationship. A less expensive and yet a functional means for accomplishing this end is disclosed in the parent application. U.S. patent application Ser. No. 564,495, wherein impending transformer saturation due to an improper phase relationship is detected by the pulse width modulator circuit. This is used to terminate the output of the reserve power source until the next normal output pulse is generated. Although the resultant delay between such output pulses is not detrimental in many cases, in some cases it can cause undesirable operation of the load being powered by the reserve power source. For example, an interruption of the flow of current to a computer may cause data to be lost.

Therefore, there is the need for a relatively simple, relatively inexpensive reserve power source wherein phase imbalances occurring at switchover from a primary power supply, which imbalances tend to create a saturation or flux imbalance condition within a drive transformer, can be quickly adjusted to prevent interruptions in the flow of current from the reserve power source to the load.

SUMMARY OF THE INVENTION

The present invention meets these needs by providing an alternating current power source which can be used to energize electrical loads, such as an electronic computer. The present invention can be coupled with another alternating current power supply for use as a reserve, or back-up, power source.

In the present invention, proper control of the alternating current output is maintained by utilizing a circuit which controls the magnitude of the output of the present invention based on the alternating current output. The preferred embodiment of the present invention specifically utilizes a rectified, optically isolated signal to drive a pulse width modulator which controls a power amplifier of an inverter circuit. The power amplifier includes a dynamic snubbing circuit for clipping transients when the inverter is powering a load and for attenuating high voltages to provide over-voltage protection when the present invention is in a stand-by mode during which another alternating current power supply is powering the load.

The output of the present invention is also controlled by a logic circuit which enables and disables the pulse width modulator depending upon the status of the monitored primary supply so that the inverter of the present invention is inoperative while the primary supply is powering the load. This logic circuit also prevents the inverter from operating when the energy source of the present invention is below a predetermined value.

The present invention also automatically detects power interruptions of the primary supply and automatically connects power from the present invention to the load when such an interruption is detected. This is achieved by means of the aforementioned logic circuit which monitors the primary power supply and opens the circuit between the primary supply and the load and then enables the inverter of the present invention whereby power is supplied to the load. To reapply power from the primary power supply to the load when the primary power supply returns to normal operation, the present invention continues to monitor the primary power supply during the disconnected period. When the primary power supply returns to normal operation, the present invention reconnects the primary power supply to the load and disables the inverter.

During the time when the primary power supply is connected to the load and provides power thereto, the primary power supply is also providing a charging current to the present invention for recharging the energy supply of the present invention.

The present invention also includes indicators for indicating in which mode it is operating and whether the energy supply of the present invention is providing a proper output.

The present invention still further includes improved means for adjusting, at switchover, phase imbalances between the power signal from the primary power supply and the power signal from the present invention.

Broadly, the present invention provides an alternating current power source which is connectible to a load between the load and an alternating current power supply, such as a commercial AC power system. The alternating current power source of the present invention comprises switch means for switchably connecting the alternating current power supply to the load. The present invention also comprises line driver circuit means for providing an electrical output from which alternating current power is derived. The present invention further comprises logic circuit means for detecting an interruption in the power provided by the alternating current power supply and for operating the switch means so that the load is electrically disconnected from the alternating current power supply when the interruption is detected and for enabling the line driver circuit means to provide its electrical output when the interruption is detected. Also included in the present invention is direct current power source means, responsive to the logic circuit means, for energizing the line driver circuit means so that the electrical output is provided when the interruption is detected. Indicator means for indicating the status of the operation of the present invention can also be included.

The line driver circuit means includes a pulse width modulator which drives a power amplifier so that a stream of pulses, wherein alternating pulses have opposite polarities, is generated to create the reserve power signal. The pulse width modulator has a shutdown output and a synchronizing input. The improved phase adjusting feature of the present invention includes, in a preferred embodiment, a diode and a capacitor connected in electrical series between the shutdown output and the synchronizing input.

Therefore, from the foregoing, it is a general object of the present invention to provide a novel and improved alternating current power source with an improved phase adjusting capability. Other and further objects, features and advantages of the present invention will be readily apparent to those skilled in the art when the following description of the preferred embodiment is read in conjunction with the accompanying drawings.

BRIEF DESCRIPTION OF THE DRAWINGS

FIG. 3 is a schematic circuit diagram of the preferred embodiment of the present invention's interconnection circuitry between the other alternating current power supply and the load.

FIGS. 4A-4C illustrate a schematic circuit diagram of the preferred embodiment of the line driver circuit identified in FIG. 2.

FIG. 5 is a schematic circuit diagram of the preferred embodiment of the battery charging and switching circuit identified in FIG. 2.

DETAILED DESCRIPTION OF THE PREFERRED EMBODIMENT

With reference to the drawings, the preferred embodiment of the present invention will be described. The preferred embodiment of the present invention is an alternating current power source 2 comprising switch means 4 and reserve alternating current power generation and control means 6.

Figure 1:
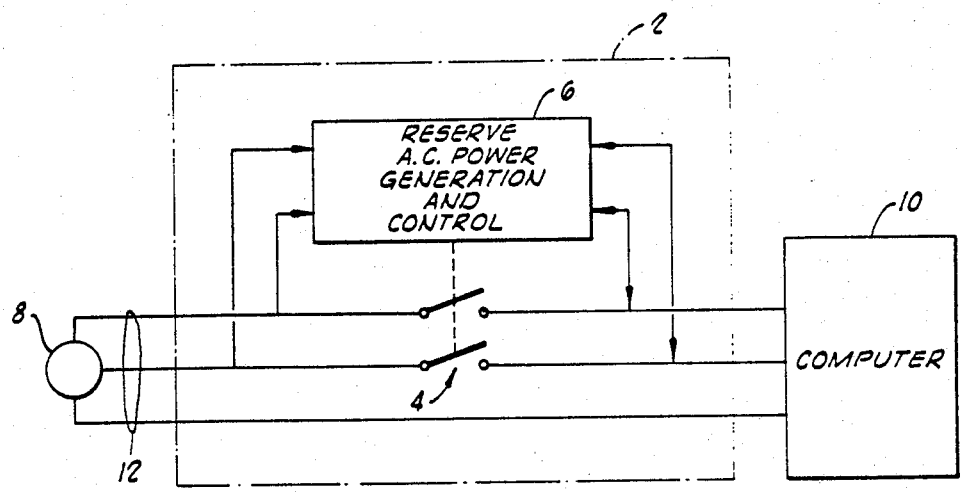
FIG. 1 is a block diagram showing the present invention associated with another alternating current power supply and a load, identified by way of example as a computer.

In the illustrated use of the preferred embodiment, the means 6 is shown as a reserve power source used to back-up an alternating current power supply 8 which is, in the exemplary illustration, a primary power supply such as a commercial 110-Vac power source for energizing an electrical load 10 shown for purposes of illustration as a computer. The primary power supply 8 and the load 10 are electrically connected to each other over an electrical transmission system 12 which has the alternating current power source 2 interconnected therewith. In the illustration of FIG. 1, the transmission system 12 is a three-conductor system; however, the present invention is not necessarily limited to use with this type of system. It is also to be noted that although the preferred embodiment of the present invention is described in its use as a reserve power supply to a primary power supply, aspects of the present invention are capable of stand-alone usage.

With the switch means 4 of the alternating current power source 2 interconnected in the electrical transmission system 12 as schematically shown in FIG. 1, the electrical circuit provided thereby can be electrically opened and closed in response to the reserve alternating current power generation and control means 6. The specific operation and construction of elements 4, 6 will be described with reference to FIGS. 2-9. It is to be initially noted, however, that the specifically illustrated embodiment is a 120-Vac, 12-Vdc rectangular wave unit. It is contemplated that other models can be made by effecting suitable changes in the construction of the illustrated embodiment as would be apparent to one skilled in the art after a review of the disclosed invention. Examples of such modifications are shown on the drawings by parenthheticals which pertain to a 24-Vdc embodiment unless otherwise noted. It is to be further noted that the resistor and capacitor values listed in the drawings are in ohms and microfarads, respectively, and that the component values listed in the drawings are not to be taken as limiting the scope of the invention.

Figure 2:
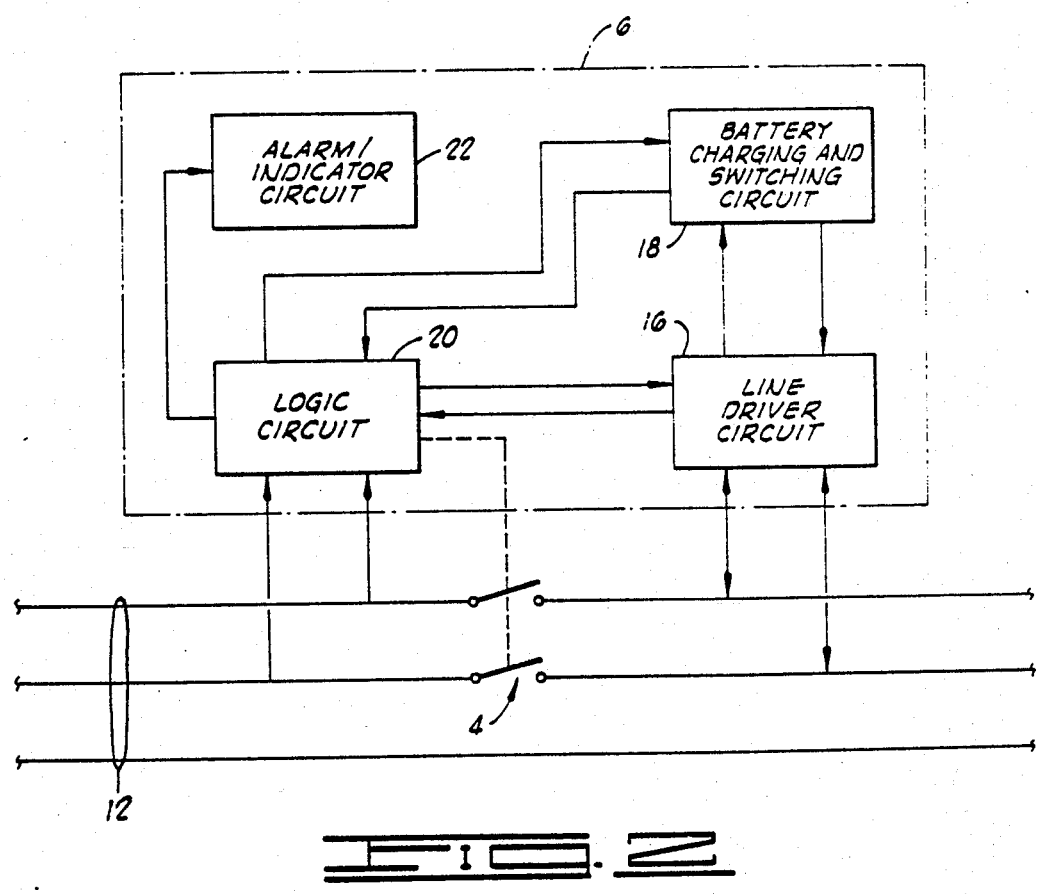
FIG. 2 is a block diagram showing functional elements of the reserve alternating current power generation and control device illustrated in FIG. 1.

As shown in FIG. 3, the switch means 4 of the preferred embodiment includes a double switching element 14 of a relay 15 having a coil which will be described hereinbelow. The switch element 14 of switch means 4 is shown in FIGS. 1-3 as being disposed within the electrical transmission system 12 for switchably connecting the load 10 to the primary power supply 8. In other words, proper manipulation of the switch element 14 opens and closes an electrical circuit provided between the primary power supply 8 and the load 10 by the electrical transmission system 12 and the circuit elements shown in FIG. 3 to be associated with the switch means 4. These additional elements are of types as known to the art and are used for purposes as also known to the art.

The reserve alternating current power generation and control means 6 includes in the preferred embodiment four circuit means as functionally illustrated in FIG. 2. These include a line driver circuit means 16 which provides an output of electrical power which can energize the load 10. The line driver circuit means 16 also includes an electrically conductive path over which a charging current from the primary power supply 8 can flow. This charging current is provided to a battery charging and switching circuit means 18 forming another part of the reserve alternating current power generation and control means 6. The circuit means 18 of the preferred embodiment provides a direct current source of energy for energizing the alternating current power source 2, and it also provides a switching mechanism between the direct current source of energy and the line driver circuit means 16 which receives its energy from the circuit means 18. To control the operation of the line driver circuit means 16 and the battery charging and switching circuit means 18, the reserve alternating current power generation and control means 6 further includes logic circuit means 20. Control by the logic circuit means 20 is provided in response to the electrical output of the primary power supply 8 and in response to the output of the direct current source of energy contained within the circuit means 18. An alarm/indicator circuit means 22, the fourth functionally illustrated circuit means of the means 6, is reponsive to the logic circuit means 20 for indicating the operating status of the reserve alternating current power generation and control means 6.

Figure 4B:
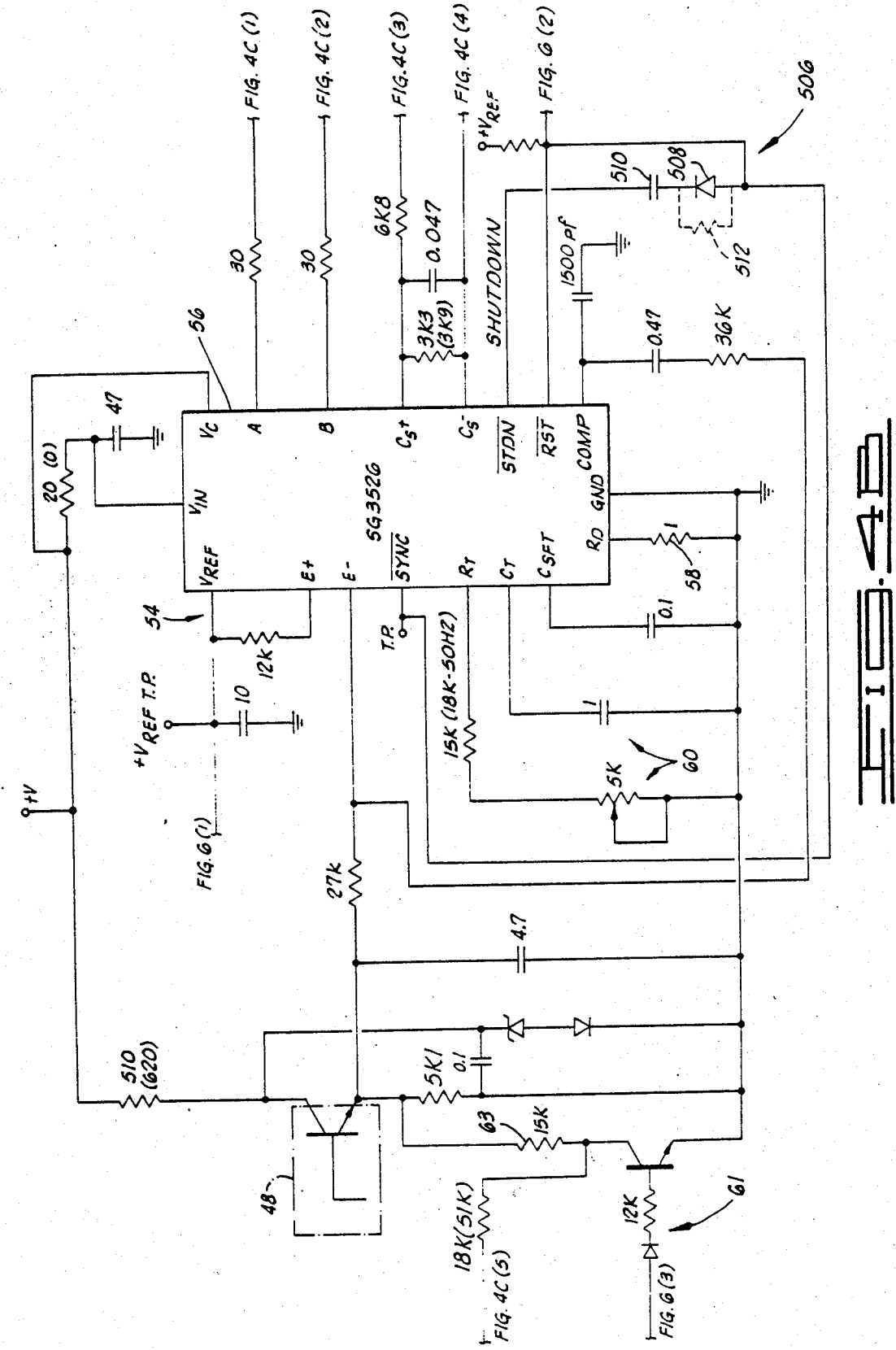

The preferred embodiment of the line driver circuit means 16 will be described with reference to FIGS. 4A-4C. FIGS. 4A and 4C disclose that the line driver circuit means 16 includes a transformer 24 constituting output means for providing an electrical alternating current output from which alternating current power is derived. The transformer 24 includes a winding 26, a winding 28, and means 30 for electromagnetically coupling the windings 26 and 28 as known to the art.

The winding 26 shown in FIG. 4A includes two winding portions 26a, 26b which can be connected in either electrical series or electrical parallel depending upon which of three jumpers 32, 34, 36 are utilized. When jumpers 32, 34 are connected as shown by the solid lines of FIG. 4A and the jumper 36 is removed as indicated by the dashed line, the winding portions 26a, 26b are connected in electrical parallel for a 110-Vac configuration of the present invention. When the jumpers 32, 34 are removed and the jumper 36 is connected, the winding portions 26a, 26b are connected in electrical series for a 220-Vac configuration of the present invention. The winding 26 is connectible to the electrical transmission system 12 between the switch means 4 and the load 10 by suitable means, such as electrical connector means 38, 40 represented in FIGS. 3 and 4A.

The winding 28 includes two winding portions which are identified as winding portions 28a, 28b in FIG. 4C. The winding portions 28a, 28b are electrically connected at a junction 42 intermediate other ends of the winding portions 28a, 28b. In the illustrated embodiment shown in FIG. 4C, the junction 42 is the center tap point of the winding 28.

The line driver circuit means 16 also includes monitoring means 44 for electrically monitoring the electrical output from the transformer 24. In particular, the monitoring means 44 detects a signal (particularly, the alternating current output signal) in the winding 26 and provides an electrical monitor signal in response thereto. This monitor signal is utilized by subsequent elements of the line driver circuit means 16 to control the output of the transformer 24. Thus, the present invention controls its alternating current output based upon the alternating current output, as well as other signals (such as direct current levels) found elsewhere in the device. This type of control enables the present invention to have the same voltage specification over the entire operating range from no load to full load.

As shown in FIG. 4A, the monitoring means 44 includes rectifier means for providing a rectified electrical signal in response to the electrical output provided through the winding 26 of the transformer 24. The rectifier means of the preferred embodiment includes a full wave bridge rectifier 46 connected to the winding 26 by electrical connector means as shown in FIG. 4A. Connected to the output of the rectifier 46 are a capacitor and Zener diode which provide limited filtering for transient suppression as known to the art. Also connected to the output of the rectifier 46 is optical coupling means for optically coupling the output of the rectifier means to the remainder of the line driver circuit means 16. The optical coupling means includes an opto-coupler device 48 of a type as known to the art and a constant current source 50 for providing a constant current so that variations in the light emitting diode (LED) of the opto-coupler device 48 are directly proportional to the alternating current voltage output of the transformer 24 as rectified by the rectifier 46. The constant current source 50 includes a variable resistor network 52 which is used for calibrating the output provided by the transformer 24. This construction of the monitoring means 44 specifically provides for voltage tracking and line synchronization of the voltage output by the transformer 24.

The line driver circuit means 16 still further includes voltage reference means for providing an electrical voltage reference in response to a direct current power source. The voltage reference means is identified in FIG. 4B by the reference numeral 54. In the preferred embodiment the voltage reference means is provided by circuitry including part of an SG3526 pulse width modulator integrated circuit 56 and a DC voltage (+V) provided within the present invention as subsequently described.

The integrated circuit 56 contains other circuitry constituting a part of a drive control means which forms another part of the line driver circuit means 16. The drive control means is responsive to the signal from the monitoring means 44 and to the electrical voltage reference for providing a drive control signal. This drive control means includes error adjustment means contained within the integrated circuit 56. The error adjustment means is, in effect, an error amplifier having inputs E+ and E− as designated in FIG. 4B. The output from this error amplifier drives outputs A and B of the integrated circuit 56 as also designated in FIG. 4B. The output of the error amplifier also provides a comparison signal (designated COMP in FIG. 4B) which is connected as negative feedback to terminate a drive pulse at output A or B whenever the input at E− exceeds the input at E+. Because of the construction of the integrated circuit 56, the error adjustment means of the preferred embodiment includes pulse width modulation means for providing a pulse width modulation signal via output A or output B in response to the monitor signal generated at the output of the opto-coupler device 48.

Also included in the drive control means of the preferred embodiment is a control input means designated as the $\overline{RST}$ input of the integrated circuit 56. This input receives a signal which enables or disables the integrated circuit 56 from providing an output at outputs A or B.

The integrated circuit 56 also includes short-circuit protection inputs designated $C_{s+}$ and $C_{s-}$ as shown in FIG. 4B. These are current sensing inputs as more particularly shown in FIG. 8, which illustrates parts of the functional features of the pulse width modulator integrated circuit 56.

Figure 8:
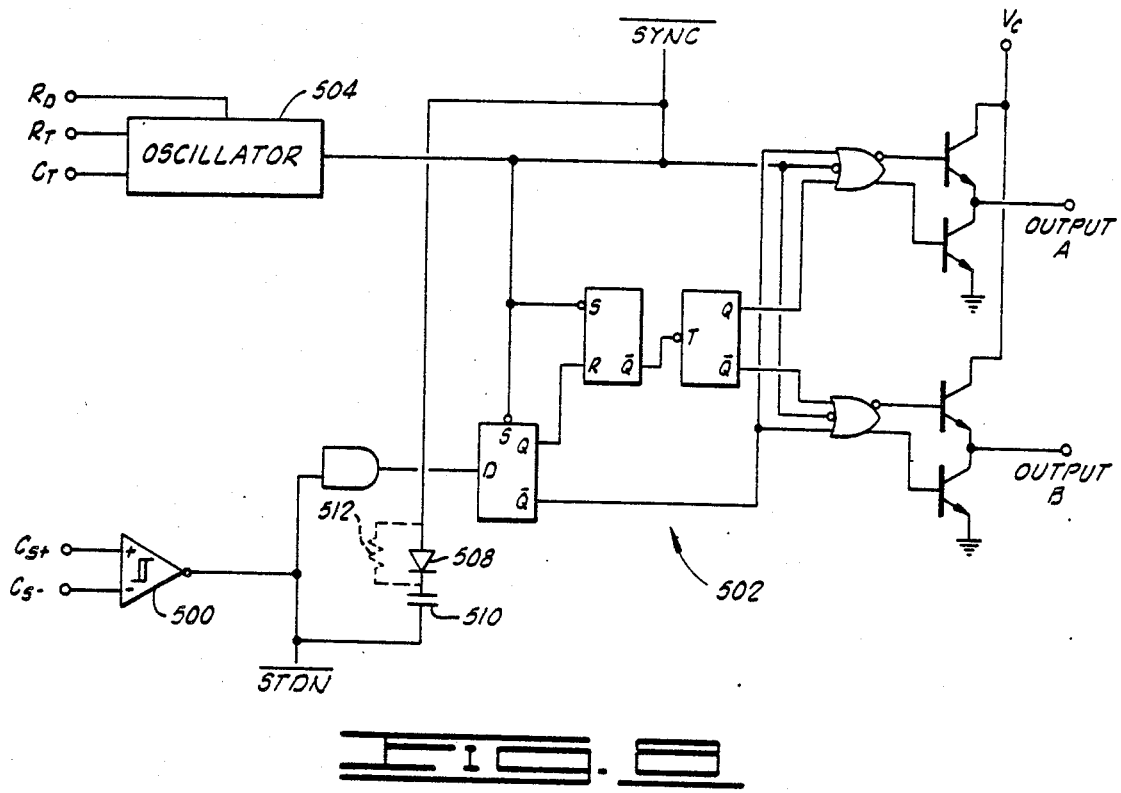
FIG. 8 is a functional circuit diagram of part of a pulse width modulator integrated circuit of the line driver circuit.

FIG. 8 shows that the $C_{s+}$ and $C_{s-}$ inputs are inputs of a comparator 500 having hysteresis. This comparator 500 detects when the voltage drop across a resistor 68 (FIG. 4C) indicates that the current flowing through winding portion 28a or 28b, if allowed to increase, would further create a flux imbalance that would saturate the transformer 24. In the preferred embodiment, the external components shown in FIG. 8 connected to the $C_{s+}$ and $C_{s-}$ inputs define a cut-off on the current ramp curve at a point above the maximum allowable current but below the saturation current for the transformer 24. When the voltage drop reaches a predetermined value indicating the cut-off point, as detected by the comparator 500, the comparator 500 generates a shutdown ($\overline{STDN}$) signal. This signal is provided to both the $\overline{STDN}$ output and a toggle means 502 of the integrated circuit 56. The shutdown signal prevents further generation of a pulse then being generated from either output A or output B of the integrated circuit 56 (see FIGS. 4B and 8), thereby stopping phase-imbalanced current flow through the respective transformer winding portion, which in turn terminates the shutdown signal, allowing the next pulse to be generated through the other output via operation of the toggle means 502, as more particularly described hereinbelow. Thus, these components define detecting means for detecting when a phase imbalance occurs at switchover, indicating an impending saturation, or flux imbalance, condition. Such detecting means includes the sensing circuitry for sensing impending saturation or flux imbalance via the current flowing through the transformer winding 28 as monitored by the voltage drop across the resistor 68.

The toggle means 502 forms part of the power signal generating means by which the auxiliary power signal of the power source 2 is generated. As with the comparator 500, the toggle means 502 is part of the integrated circuit 56 as known to the art. The toggle means 502 alternately controls and actuates separate sections of a power amplifier shown in FIG. 4C and subsequently described hereinbelow. Although the toggle means 502 can be disabled by the shutdown signal, it is normally controlled by a timing means including an oscillator 504 which is also part of the integrated circuit 56. Together, the toggle means 502 and the oscillator 504 provide a switching means for controlling the amplifier means to alternate the voltage magnitude generated by the power amplifier means between different polarities.

The oscillator 504 provides an oscillating, periodic switching control signal having a first state during a first predetermined time period of each cycle and having a second state during a second predetermined time period in each cycle. The length of these two time periods, and thus of the overall cycle time period for the oscillator signal, is determined by a resistor 58 and a resistor-capacitor network 60 illustrated in FIG. 4B. In the preferred embodiment, the resistor 58 determines the deadband of the integrated circuit 56 which occurs during the aforementioned second predetermined time period. The resistor-capacitor network 60 controls the length of the first predetermined time period. In the preferred embodiment these are set for achieving either 50 or 60 hertz operation.

During the first predetermined time period of each cycle of the oscillator signal, the toggle means 502 is enabled to drive one of two outputs, which outputs are identified as output A and output B in FIGS. 4B and 8. During the second predetermined time period of each cycle of the oscillator signal, the toggle means 502 is disabled so that neither output A nor output B is actuating the power amplifier means shown in FIG. 4C. For this operation to occur in the preferred embodiment, the first state of the oscillator signal is a high logic level during the first predetermined time period and the second state of the oscillator signal is a low logic level during the second predetermined time period. In response in part to this oscillator signal, a pulse width modulated power control signal with a predetermined voltage magnitude is provided through either output A or output B, depending upon the particular state of the toggle means 502, during the first predetermined time period of a cycle of the oscillator signal. When this power control signal terminates, a deadband (or polarity interruption time period) occurs wherein no power control signal is provided through either of the outputs for the duration of that cycle of the oscillator signal. During the first predetermined time period of the next cycle of the oscillator signal, a new pulse width modulated power control signal is provided through the other one of the output A or B. Finally, a deadband again appears between this second output and another pulse width modulated power control signal provided from the initial output A or B during the first predetermined time period of the third cycle of the oscillator signal.

By this construction and operation of the integrated circuit 56 whereby the power control signals are generated, the power amplifier shown in FIG. 4C is controlled to provide, under normal operation, a power signal sequentially including a voltage pulse having a first polarity (e.g, positive), a deadband having a neutral polarity, a voltage pulse having a second polarity (e.g., negative), another deadband having a neutral polarity, then a repetition of this cycle of opposite polarity pulses separated by deadbands. Each deadband defines a temporal separation between the consecutively generated power signal pulses which have opposite polarities; the overall period of the oscillator 504 timing signal defines a temporal separation between the commencement of consecutive ones of the voltage pulses. During such operation, if impending saturation is detected by the comparator 500 as described hereinabove, the then-occurring voltage pulse (if any) is immediately terminated whereby the normal deadband which would have otherwise occurred between that pulse and the next pulse is lengthened by the shortened portion of the terminated pulse. In some computer back-up applications wherein the present invention might be used, such extended deadband period could be detrimental.

To prevent the occurrence of this lengthened deadband period at the time of switchover from the primary power source to the reserve power source, the present invention includes a phase switching means 506 for causing the power signal generating means to generate the power output voltage pulse with an opposite polarity immediately upon the termination of the prior pulse when the aforementioned impending saturation, or flux imbalance, is detected. In the preferred embodiment, the phase switching means 506 includes a diode 508 connected between the output of the comparator 500 (specifically, at the shutdown output of the integrated circuit 56) and the output of the oscillator 504 (specifically, the synchronizing input of the integrated circuit 56) as illustrated in FIG. 8. As illustrated in FIG. 4B, the diode 508 has its cathode connected to the shutdown output of the integrated circuit 56, and it has its anode connected to the synchronizing input, and also the reset input, of the integrated circuit 56. The cathode is connected to the shutdown output through a capacitor 510 which, together with the diode 508, provide limiting means for controlling the number of times the shutdown signal from the comparator 500 can cause the immediate phase switching provided by this portion of the present invention. This limiting occurs through the discharge rate defined by the capacitance of the capacitor 510 and the leakage impedance of the diode 508. To better control this discharge time, a resistor 512 can be connected in electrical parallel across the diode 508. The resistance value of the resistor 512 is selected to make the leakage impedance of the diode 508 substantially immaterial in calculating the discharge rate then defined by the addition of the resistor 512.

The operation of the foregoing aspects of the present invention will be more particularly described hereinbelow with reference to FIG. 9.

The drive control circuitry shown in FIG. 4B also includes a compensation circuit 61 having the elements and connections as indicated in FIG. 4B. The circuit 61 provides a dc voltage level shift at the input of the error amplifier to compensate for the different dc voltage levels which appear at the error amplifier inputs between when the primary power supply 8 is energizing the load 10 and when the line driver circuit means 16 of the present invention is energizing the load. In the preferred embodiment the primary power supply 8 appears as a higher dc level than does the pertinent part of the line driver circuit means 16 during standby; therefore, the circuit 61 equalizes these apparent dc voltage levels. This compensation or equalization enables the present invention to switchover between energizing the load 10 with the primary power supply 8 and energizing the load 10 with the present invention more quickly than could be done if the offset between the apparent dc voltage levels were not compensated. This switchover speed can be enhanced by using a diode in place of a resistor 63 shown in FIG. 4B.

The circuit 61 also provides feed forward compensation to enhance the operation of the control loop within the line driver circuit means 16.

The line driver circuit means 16 additionally includes drive means 62 for actuating the transformer 24 to provide the electrical output which is to be transferred to the load 10 via the connector means 38, 40. The drive means 62 of the preferred embodiment is illustrated in FIG. 4C and is responsive to the drive control signals provided at outputs A and B of the integrated circuit 56. The drive means 62 of the preferred embodiment includes a push-pull power amplifier functioning as an inverter for converting a direct current power signal to an alternating current power signal which can be transferred by transformer action from the winding 28 to the winding 26. Therefore, when the power amplifier is driving the transformer 24, the winding 28 is functioning as a primary winding and the winding 26 is functioning as a secondary winding; however, these designations of the windings 26, 28 are reversed when a charging current is provided through the transformer 24 as described hereinbelow.

The power amplifier means of the preferred embodiment has two power switching sections connected between the non-common ends of the winding sections 28a, 28b. More particularly, there is provided a first power switching means electrically connected between the junction 42 and the other end of the winding portion 28a, and there is also provided a second power switching means electrically connected between the junction 42 and the other end of the winding portion 28b. These power switching means include a plurality of MOSFET's 64, 66, respectively, of a type as known to the art. These MOSFET's have commonly connected source terminals which are connected to the junction 42 through the resistor 68 which establishes a voltage used by the integrated circuit 56, via the $C_{s+}$ and $C_{s-}$ inputs, to determine if an over-current situation exists. Each of the MOSFET's 64, 66 has an internal diode connected between the source and drain terminals as known to the art and as illustrated for two of the MOSFET's shown in FIG. 4C.

The gate terminals of the MOSFET's 64 are connected by suitable connector means 70 to the drive control means, specifically the output A of the integrated circuit 56. The connector means 70 of the preferred embodiment includes the electrical conductors and resistors schematically represented in FIG. 4C. A similar connector means 72 is provided between the gate terminals of the MOSFET's 66 and the output B of the integrated circuit 56.

Another element of the drive means 62 is means for limiting the magnitude of a voltage at the drain terminals of the MOSFET's 64, 66. In the illustrated preferred embodiment, this means includes diode means 74 connected between the non-common end of the winding portion 28a (and similarly the commonly connected drain terminals of the MOSFET's 64) and the connector means 70 connected to the output A of the integrated circuit 56. A similar diode means 76 is connected between the non-common end of the winding portion 28b (and the commonly connected drain terminals of the MOSFET's 66) and the connector means 72 connected to the output B of the integrated circuit 56. These diode means provide a dynamic snubber means for limiting voltage magnitudes. The schematically illustrated diode and two Zener diodes of the diode means 74 become conductive to current when the voltage at the drain terminals of the MOSFET's 64 reaches the condition voltage of the diode chain. This conduction enables the gate voltages of the MOSFET's 64 to become high enough to cause conduction between the source and drain terminals thereof. When this occurs, the MOSFET's 64 become a low impedance which kills or clips voltage transients which occur during the running mode of the present invention wherein electrical power is being provided by the present invention to the load 10. During the standby mode of the present invention wherein the present invention is not providing power to the load 10, but is receiving a charging current through the transformer 24, the MOSFET's 64 can become low impedances in a similar manner to flatten high voltages which appear in the circuit through the transformer 24. The diode means 76 and MOSFET's 66 operate similarly.

Still another part of the line driver circuit means 16 includes a full wave bridge rectifier constructed of a diode 78, a diode 80, and the internal diodes of the MOSFET's 64, 66. The output of this full wave bridge rectifier is provided via an electrical connector means 82. The rectifier means and connector means establish, along with the connector means 38, 40 and the transformer 24, the aforementioned charging path which is connected to the battery charging and switching circuit means 18. In this charging current path, the transformer 24 functions so that the winding 26 is the primary winding and the winding 28 is the secondary winding.

With this construction of the line driver circuit means 16, it is apparent that a feedback control loop from the winding 26 of the transformer 24 to the inputs of the error amplifier contained within the integrated circuit 56 is provided for controlling the power generated by the drive means 62 in response to the pulse width modulated signals from the integrated circuit 56. This feedback is based in the preferred embodiment upon the alternating current voltage output of the transformer 24.

In addition to operating in response to the pulse width modulated signals from the outputs A and B of the integrated circuit 56, the drive means 62 also operates in response to direct current power provided by the battery charging and switching circuit means 18 having a preferred embodiment schematically illustrated in FIG. 5. The circuit means 18 includes power supply means for providing energy to the drive means 62 and to the remainder of the reserve alternating current power generation and control means 6. In the preferred embodiment, this power supply means includes a battery 84 which provides a source of direct current energy. In the preferred embodiment the battery 84 is a 12-volt/300-watt battery which enables the present invention to be readily used with common direct current sources such as are found in a home or a car. It is contemplated that other types of batteries can be used in the present invention, such as a 24-volt battery which would enable the present invention to be readily used in aircraft.

The circuit means 18 also includes means for electrically connecting the battery 84 to the junction 42 of the transformer 24. This connector means includes a switch element 86 comprising part of a relay 87 having a coil which will be described hereinbelow. When the switch element 86 is in its lower position opposite that position shown in FIG. 5, a circuit is closed from the pole of the switch element 86 to the junction 42 at which the direct current energy is provided to the power amplifier means.

Also included within the connector means shown in FIG. 5 is a manual switch means 88 which is the master ON/OFF switch of the present invention. When the switch 88 is in the position opposite that shown in FIG. 5, the battery 84 is electrically connected to the pole of the switch element 86, thereby completing the circuit between the battery 84 and the power amplifier means. When the switch 88 is in the position shown in FIG. 5, the alternating current power source 2 is prevented from providing power to the load 10.

Also included in the circuit means 18 is a voltage regulation circuit 90 which is connected between the electrical connector means 82 and the upper terminal of the switch element 86 as shown in FIG. 5. The voltage regulation means 90 provides a regulated voltage which is applied through the switch element 86 when the switch element 86 is in the position as shown in FIG. 5 for recharging the battery 84 when the switch means 88 connects the battery 84 to the pole of the switch element 86.

The voltage regulation means 90 is shown in the preferred embodiment to include a 470-ohm resistor. This resistor functions with a corresponding resistor straddling the switch element 86 and the diodes 78, 80 and related components to function as a snubber circuit when the present invention is energizing the load 10.

The circuit means 18 still further includes means for providing the +V source to the present invention. When the battery 84 is a 24-volt battery, another voltage regulation means 92 is used; however, when the battery 84 is a 12-volt battery, a jumper 94 is installed as shown in FIG. 5 to electrically short, and thereby circumvent, the voltage regulation means 92.

Figure 6:
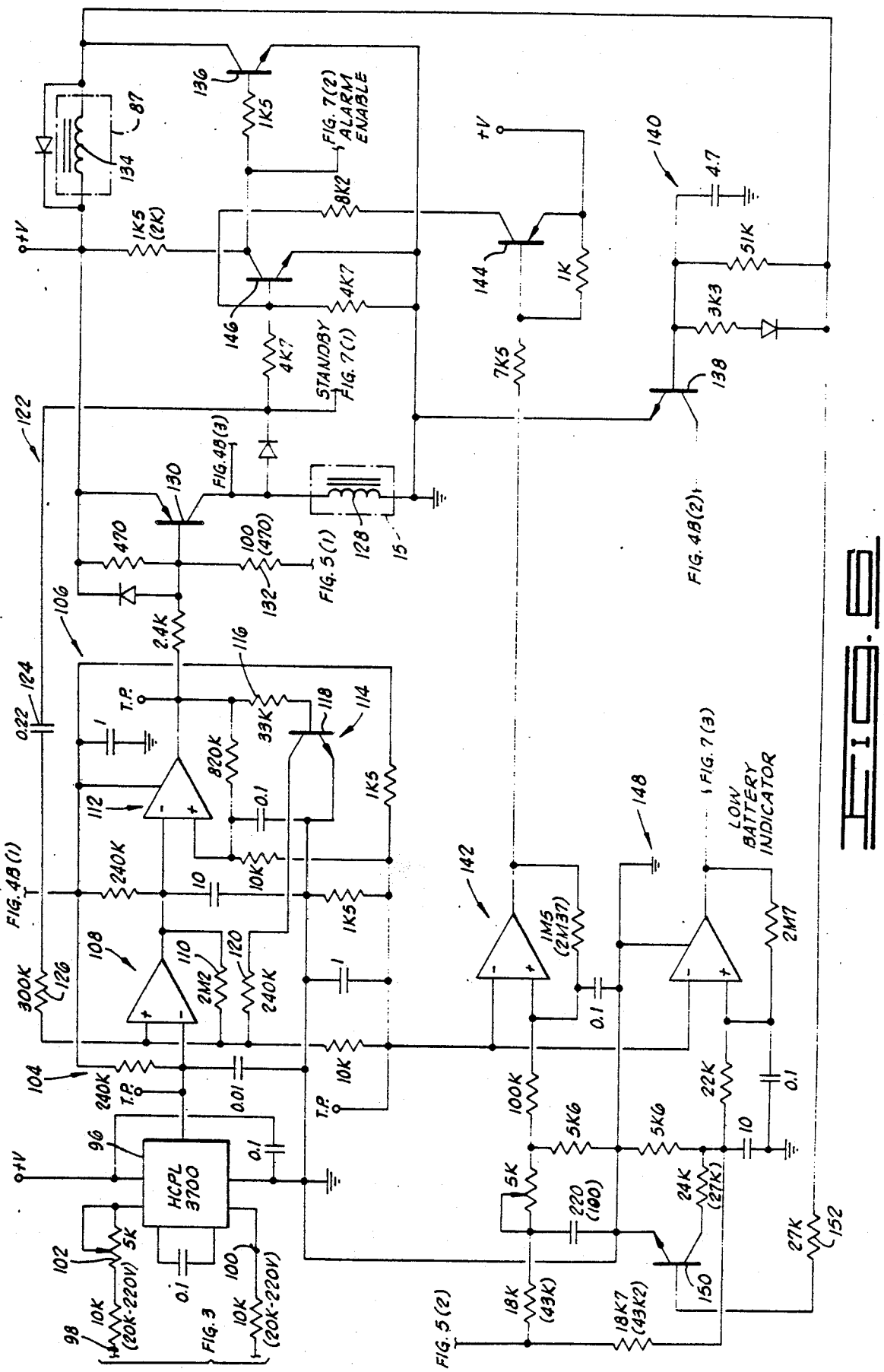
FIG. 6 is a schematic circuit diagram of the preferred embodiment of the logic circuit identified in FIG. 2.

The preferred embodiment of the logic circuit means 20 is schematically illustrated in FIG. 6. The logic circuit means 20 detects an interruption in the power provided by the primary power supply 8 and operates the switch means 4 so that the load 10 is electrically disconnected from the supply 8 when an interruption is detected and operates the switch means so that the load 10 is electrically reconnected to the supply 8 when no interruption is detected. The logic circuit means 20 also enables the line driver circuit means 16 to provide the electrical output from the transformer 24 when an interruption is detected. The logic circuit means 20 disables the line driver circuit means 16 when no interruption is detected. The logic circuit means also monitors the output of the battery 84, and it actuates the alarm/indicator circuit means 22.

The logic circuit means 20 includes monitoring means for providing an electrical signal related to the magnitude of the power signal provided by the primary power supply 8. In the preferred embodiment of the logic circuit means 20 shown in FIG. 6, the monitoring means includes an optical coupler integrated circuit 96 comprising a full wave bridge rectifier with a constant current circuit running an internal light emitting diode. The integrated circuit 96 is connectible to the electrical transmission system 12 between the primary power supply 8 and the switch means 4. This connectibility is indicated in FIGS. 3 and 6 by the electrical connector means 98, 100 which include the fixed resistors shown in FIG. 6. The electrical connector means 98 also includes a potentiometer 102 which sets the threshold of the integrated circuit 96. The integrated circuit 96 monitors the output of the primary power supply 8 through the electrical connector means 98, 100 and provides an output into a resistor-capacitor network 104 which converts the normally square wave output of the integrated circuit 96 to a ramp waveform.

This ramp waveform is connected to an input of a comparator means 106 for comparing the electrical signal having the ramp waveform with a variable reference signal and for providing a power interruption indicating signal when the electrical signal exceeds the variable reference signal and for terminating the power interruption indicating signal when the variable reference signal exceeds the electrical signal. In the preferred embodiment shown in FIG. 6, the power interruption indicating signal is a logic signal having a magnitude representing a first logic state when the electrical signal from the monitoring means of the logic circuit means 20 exceeds the variable reference signal and having a different magnitude representing a second logic state when the variable reference signal exceeds the signal from the monitoring means.

In the preferred embodiment the first logic state is a high or "1" logic level and the second logic state is a low or "0" level. The high logic state represents a power interruption and the low logic state represents the absence of a power interruption.

In the preferred embodiment the two inputs to which the electrical signal from the integrated circuit 96 and the variable reference signal are connected are provided by the inverting and non-inverting inputs, respectively, of an operational amplifier means 108. The operational amplifier means 108 is constructed to function as a comparator which compares the electrical signals at the two inputs and provides a switching signal in one of two magnitudes at its output in response to the comparison. To provide hysteresis for noise attenuation, the operational amplifier means 108 includes feedback means comprising a resistor 110 in the preferred embodiment.

The output from the operational amplifier means 108 is provided to the inverting input of an operational amplifier means 112 which provides the aforementioned logic signal in either the first logic state or the second logic state depending upon the state, or magnitude, of the switching signal received from the operational amplifier means 108. The operational amplifier means 112 of the comparator means 106 is constructed to function as a delay gate when the switching signal switches from the state indicating that a power interruption exists to the state indicating that no power interruption exists. That is, the operational amplifier means 112 functions as delay means for delaying, for a predetermined time period, the termination of the power interruption indicating signal after the variable reference signal exceeds the electrical signal provided by the integrated circuit 96. In the preferred embodiment the predetermined time period is approximately three seconds. This delay occurs when the present invention is switching from providing its power to the load 10 to reconnecting the primary power supply 8 to the load 10. The delay at this switchover prevents ratcheting of the present invention which would result if a rapid series of outages of the primary power supply 8 occurred at the time of the switchover.

To provide the variable reference signal which is connected to the non-inverting input of the operational amplifier means 108, the logic circuit means 20 further comprises variable reference setting means which is responsive to the comparator means 106. In the preferred embodiment shown in FIG. 6, the variable reference setting means includes feedback means 114 comprising a resistor 116, a transistor 118 and another resistor 120 connected as shown in FIG. 6 between the output of the operational amplifier means 112 and the non-inverting input of the operational amplifier means 108. When the logic signal provided at the output of the operational amplifier means 112 is in its high logic state, the transistor 118 is switched into its conductive state so that the resistor 120 affects the voltage level constituting the variable reference signal at the non-inverting input of the operational amplifier means 108. In the illustrated preferred embodiment, this affect is to decrease or reduce the magnitude of the voltage which, in effect, raises the threshold level at which the operational amplifier means 108 will change the state of its output switching signal. That is, this adjustment of the variable reference signal in this direction moves the reference level so that a greater line voltage from the primary power supply 8 is required to indicate a revival of the primary power supply 8 after a detected power interruption. For example, the normal standby threshold of the operational amplifier means 108 could establish that a voltage below 103 Vac would be required to switch the comparator means from its low logic state to its high logic state. If this low voltage were to occur, the feedback means 114 would be activated to raise the threshold to 110 Vac, which would require the line voltage from the primary supply 8 to exceed 110 Vac before the comparator means 106 would switch from its high logic level output to its low logic level output. This insures that the primary power supply 8 output has recovered before the switchover from the present invention to the primary power supply is made.

The variable reference setting means further comprises feedback means 122 including a capacitor 124 and a resistor 126. The feedback means 122 adjusts the variable reference signal at the non-inverting input of the operational amplifier means 108 in another direction when the logic signal at the output of the comparator means 106 switches from its high logic state to its low logic state in the preferred embodiment. This adjustment temporarily increases the magnitude of the voltage of the variable reference signal in the preferred embodiment at the time the power interruption indicating signal from the comparator means 106 is terminated.

At this time, the feedback means 122 provides a pulse having a duration of from ten to fifteen milliseconds to change the variable reference signal so that a lower voltage than normal is required to trigger the application of power from the present invention to the load 10. For example, the aforementioned normal variable reference signal establishing a threshold of 103 Vac is shifted to establish a threshold of 90 Vac so that a power interruption is detected only if the monitored power signal from the primary power supply 8 drops below 90 Vac. Therefore, this pulse substantially locks-out the operation of the present invention during this ten to fifteen millisecond time period. The need for this lock-out exists because the power signal provided by the primary power supply 8 may be temporarily reduced at the time of switchover between power application by the present invention to power application by the primary power supply 8. This reduction can occur because at the switchover time the present invention acts as a momentary load to the primary power supply 8. This momentary loading could temporarily decrease the line voltage from the primary power supply 8 to a level below the normal standby threshold of 103 Vac which would cause an improper reswitching between the primary power supply 8 and the present invention.

The logic circuit means 20 further includes a switch operation means having in the preferred embodiment a relay coil 128 forming a part of the relay 15 having the switch element 14 (see FIG. 3). This switch operation means, being responsive to the logic signal provided by the comparator means 106, operates the switch element 14 to electrically disconnect the load 10 from the primary power supply 8 when the logic signal is in its high logic state and to electrically connect the primary power supply 8 to the load 10 when the logic signal is in its low logic state. In the preferred embodiment, the disconnection occurs by opening the switch element 14 and the connection occurs by closing the switch element 14. Opening of the switch is effected by de-energizing the relay coil 128 when the power interruption has been detected as indicated by the logic signal being in its high logic state, and closing of the switch occurs by energizing the relay coil 128 through a transistor 130 when the logic signal is in its low logic state.

Associated with the transistor 130 is a resistor 132 through which a terminal of the switch means 88 (see FIG. 5) is connected to the base terminal of the transistor 130. With this connection, the transistor 130 is maintained in a non-conductive state so that the switch element 14 is maintained open when the switch means 88 is in the position shown in FIG. 5, thereby providing a master OFF control to the present invention.

The logic circuit means 20 includes another switch operation means which in the preferred embodiment includes a relay coil 134, forming a part of the relay 87, which responds to the logic signal from the comparator means 106 to operate the switch element 86 shown in FIG. 5. When the logic signal is in its high state (and the transistor 130 is not disabled by the switch means 88), the relay coil 134 is energized through a transistor 136. Energization of the coil 134 switches the switch element 86 to its lower position as viewed in FIG. 5 whereby the circuit between the switch means 88 and the power amplifier means of the drive means 62 is closed. Therefore, this closes a circuit over which the energy from the battery 84 can be transferred to the power amplifier means. This connects the battery to a portion of the line driver circuit means 16 when a power interruption is detected.

When the logic signal from the comparator means 106 is in its low logic state in the preferred embodiment, the coil 134 is deenergized which releases the switch element 86 back to its position as shown in FIG. 5 wherein a circuit through which the battery 84 can be connected to another portion of the power amplifier means is provided. This circuit includes the aforementioned charging current path which includes the full wave bridge rectifier constructed of the diodes 78 and 80 and the diodes of the MOSFET's 64, 66. Upon the release of the switch element 86, the battery 84 is disconnected from the connection whereby the battery 84 energizes the MOSFET's 64, 66 of the power amplifier means.

The logic circuit means 20 still further includes means for controlling the drive control means of the line driver circuit means 16. In the preferred embodiment this means is a pulse width modulation control means for enabling or disabling the operation of the pulse width modulation integrated circuit 56 through the $\overline{\text{RST}}$ and $\overline{\text{SYNC}}$ inputs thereof. This control means provides a control signal through a transistor 138 to the $\overline{\text{RST}}$ and $\overline{\text{SYNC}}$ inputs of the integrated circuit 56. Connected to the base terminal of the transistor 138 is a resistor-capacitor-diode network 140 which provides timing control in response to the logic signal provided by the comparator means 106. When the logic signal switches to its high logic state, thereby indicating a power interruption, the transistor 138 is maintained in its conductive state, and thus its integrated circuit 56-disabling state, for a predetermined time period during which the switch element 14 of the switch means 4 can fully disconnect to insure that the primary power supply 8 is disconnected from the load 10 before the alternating current power source 2 of the present invention provides its power to the load 10. This time period in the preferred embodiment is a few milliseconds as determined by the particular values selected for the resistor-capacitor-diode network 140. After this time period elapses, the transistor 138 becomes non-conductive thereby providing an enable signal to the integrated circuit 56. This time period can be reduced or deleted, as appropriate, if a faster switch element, such as a solid state relay, is used in the switch means 4.

When the logic signal switches from its high logic state to its low logic state, thereby indicating that normal power has returned from the primary power supply 8, the resistor-capacitor-diode network 140 holds the $\overline{\text{RST}}$ and $\overline{\text{SYNC}}$ inputs disabled with the integrated circuit 56 enabling signal so that the integrated circuit 56 remains enabled for approximately eleven to fourteen milliseconds (in the preferred embodiment) after the switching of the logic signal. This predetermined time period allows the switch element 14 of the switch means 4 to close before the application of power to the load 10 by the present invention is terminated. After this time period expires, the transistor 138 becomes conductive thereby providing a disable signal to the integrated circuit 56. With the use of the phase switching means 506, this time period can be increased as needed to reduce any gap between the application of power from the reserve power source and the application of power from the primary power supply because, should any overrun or overlap of these occur for a brief time, the phase switch means 506 can reverse polarities of the auxiliary power signal to compensate for an overcurrent condition which might result.

The logic circuit means 20 also includes low voltage detector means for detecting when a voltage provided by the battery 84 in the preferred embodiment is below a predetermined value. In the preferred embodiment shown in FIG. 6, the low voltage detector means includes operational amplifier means 142 which compares the battery 84 voltage with a reference signal at its inverting input to provide an output for controlling a transistor 144 and a transistor 146. When the battery 84 voltage is below the predetermined reference level, the output of the operational amplifier means 142 causes the transistor 144 to conduct which in turn causes the transistor 146 to conduct, thereby holding the transistor 136 non-conductive. This prevents the coil 134 from being energized which also prevents the switch element 86 from connecting the battery 84 to the power amplifier means.

In the preferred embodiment the operational amplifier means 142 has a threshold which is set high enough to prevent the battery 84 from exceeding the threshold, and thus to prevent resetting the present invention to a normal operational mode, merely through the battery's self-recovery. However, this threshold is low enough so that it is exceeded by the battery 84 voltage once the battery 84 has been sufficiently recharged by the recharging current. This operation creates the possibility that the present invention will be unable to provide back-up power for a period of time if the battery 84 has been sufficiently drained during a previous back-up period, for example; however, it also provides automatic recovery or resetting of the present invention from such a drained situation once the battery 84 has been sufficiently recharged or replaced.

The low voltage detector means also includes operational amplifier means 148 which provides a low battery indicator signal to the alarm/indicating circuit means 22. The input network of the operational amplifier means 148 includes a transistor 150 whose conductivity is controlled through a resistor 152 in response to the logic signal provided by the comparator means 106. When the logic signal is in its high logic state indicating a power interruption has occurred and effecting the application of power by the present invention to the load 10 under normal running conditions, the transistor 150 is held non-conducting which sets a first reference level at the non-inverting input of the operational amplifier means 148. Therefore, before the low battery indicating signal is generated, the battery voltage must drop below this first reference level when the present invention is functioning in its running mode. In the illustrated preferred embodiment, this first reference level is 10.7 Vdc.

When the logic signal is in its low state, thereby indicating no power interruption wherein the present invention is operating in its standby mode, the transistor 150 is made conductive which changes the reference level at the non-inverting input of the operational amplifier means 148 so that the low battery indicating signal is provided only when the battery voltage drops below this second reference level. In the illustrated preferred embodiment, this second reference level is 12.9 Vdc.

Figure 7:
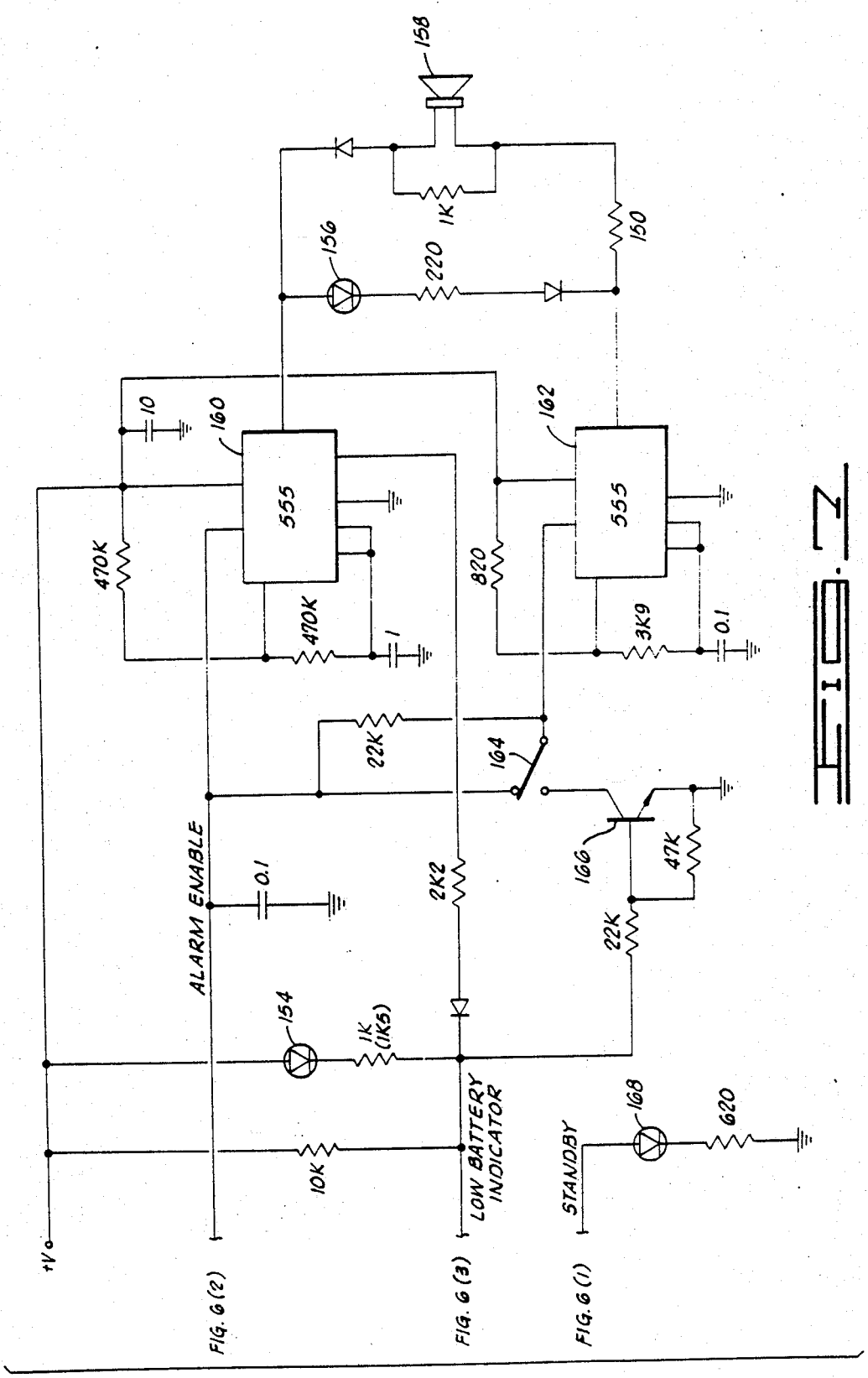
FIG. 7 is a schematic circuit diagram of the preferred embodiment of the alarm/indicator circuit identified in FIG. 2.

Whenever the low battery indicating signal is generated by the operational amplifier means 148, it illuminates a light emitting diode 154 within the alarm/indicator circuit means 22 as shown in FIG. 7.

The alarm/indicator circuit means 22 also includes indicator means for indicating when the logic signal is in its first state thereby indicating that the present invention is in its run mode of operation. The indicator means of the preferred embodiment includes a light emitting diode 156 and a buzzer or other audible indicator 158. The indicators 156, 158 are actuated by an indicator drive means comprising in the preferred embodiment integrated timer means 160 and integrated timer means 162. Generally, the timers 160, 162 are actuated in response to an alarm enable signal provided from the logic circuit means 20 as shown in FIG. 6. In the illustrated preferred embodiment, the alarm enable signal is not only responsive to the logic signal from the comparator means 106, but also to both the master ON/OFF switch as it affects the operation of the transistor 130 and the low battery indicator as it affects the operation of the transistor 146. The timer 162 is also responsive to the positioning of a manual switch 164 which connects the actuation input of the timer means 162 to either the alarm enable signal or to a transistor 166 which is responsive to the low battery indicator signal.

When the alarm enable signal actuates the timer 160 and the low battery indicator signal is indicating that the battery voltage is above the pertinent reference level, the timer 160 illuminates the light emitting diode 156 at a first rate which in the preferred embodiment is one hertz. When the low battery indicator signal is indicating a low battery voltage and the alarm enable signal enables the timer 160, the timer 160 illuminates the light emitting diode 156 at a second rate which in the preferred embodiment is three hertz. If the timer 162 is connected through the switch 164 as shown in FIG. 7, the light emitting diode 156 is duty-cycled according to the rate of the timer 162, which rate in the preferred embodiment is 2,000 hertz. Operation of the timer 162 also actuates the buzzer 158.

When the switch 164 is in its position opposite that shown in FIG. 7 whereby the timer 162 is connected to the transistor 166, the light emitting diode 156 is operated at the full rate set by the timer 160 and the buzzer 158 is not operated until the low battery indicator signal indicates a low battery status whereby the transistor 166 is then enabled to actuate the timer 162 to drive the buzzer 158 and duty-cycle the light emitting diode 156.

The alarm/indicator circuit means 22 is also shown in FIG. 7 to include a light emitting diode 168 which is driven by a standby signal shown in FIG. 6. The light emitting diode 168 is illuminated when the present invention is in its standby mode as indicated by the logic signal from the comparator means 106 being in its low logic state.

Although not shown in FIG. 7, it is contemplated that options as to an external cut-off of the timer 162 and as to non-isolated and isolated indicator drive signal outputs can be incorporated within the alarm/indicator circuit means 22.

In using the alternating current power source 2 constructed in accordance with the preferred embodiment of the present invention, the circuit shown in FIG. 3 is first connected into the electrical transmission system 12 between the primary power supply 8 and the load 10. To make the present invention functional, the master ON/OFF switch 88 shown in FIG. 5 is moved to its ON position, the position opposite that shown in FIG. 5.

With the present invention so interconnected and actuated, the logic circuit means 20 monitors the AC line from the primary power supply 8 as represented in FIG. 2 and as shown through the electrical connector means 98, 100 in FIGS. 3, 6. When the logic circuit means 20 detects a power interruption, the comparator means 106 generates the proper logic signal at its output.

When this logic signal indicating a power interruption is generated, and assuming no low battery problems, the coil 128 is de-energized so that the switch element 14 opens, thereby disconnecting the primary power supply 8 from the load 10. Additionally, the relay coil 134 is energized whereby the switch element 86 moves from its charging position shown in FIG. 5 to its run position wherein the battery 84 is connected to the power amplifier means of the drive means 62. The light emitting diode 156 is illuminated, and the buzzer 158 is sounded if the timer 162 is connected in the circuit via the switch 164 placed in the position shown in FIG. 7.

After the predetermined time period established by the network 140 has elapsed following the generation of the logic signal to indicate a power interruption, the transistor 138 causes the $\overline{RST}$ and $\overline{SYNC}$ inputs of the integrated circuit 56 to be disabled which enables the integrated circuit 56 to drive the drive means 62 whereby an alternating current electrical signal output is provided to the load 10 through the transformer 24 and the electrical connector means 38, 40.

This alternating current output is tracked by the error amplifier means of the integrated circuit 56 through the rectifier means 46 and the opto-coupler device 48. Drive signals A and B from the integrated circuit 56 are appropriately modulated to provide proper drive to the power amplifier means of the drive means 62. Control of the drives A and B is also effected through the comparator output of the integrated circuit 56, through the current monitoring resistor 68 and the $C_{s+}$ and the $C_{s-}$ inputs of the integrated circuit 56, and through the phase switching means 506.

Because of th disposition of the electrical connector means 98, 100 between the primary power supply 8 and the switch means 4, the logic circuit means 20 continues to monitor the primary power supply 8 even after a power interruption has been detected. When the output of the primary power supply 8 returns to a level which drives the output of the integrated circuit 96 below the variable reference signal established by the feedback means 114 at the non-inverting input of the operational amplifier means 108, the comparator means 106 switches its output logic signal to indicate the return of normal power. The switching of this logic signal causes the relay coil 128 to be energized and the relay coil 134 to be de-energized which respectively closes the switch element 14 and switches the switch element 86 back to its charging position. After the predetermined time period established by the network 140 expires after this switching of the logic signal, the integrated circuit 56 is disabled through the $\overline{RST}$ and $\overline{SYNC}$ inputs so that power is again provided to the load 10 solely from the primary power supply 8. Additionally, a charging current is provided to recharge the battery 84 through the charging path including the transformer 24 and the full wave bridge rectifier defined by the diodes 78, 80 and those of the MOSFET's 64, 66. When the logic signal switches to indicate the power interruption is over, the light emitting diode 156 and the buzzer 158 are de-energized and the light emitting diode 168 is energized.

Should a low battery status be detected, the low battery detector means controls the operation of the coil 134 and the indicators of the alarm/indicator circuit means 22 as previously described. This control prevents the present invention from supplying power to the load 10; however, it does not prevent the switch means 4 from disconnecting the load 10 from the primary power source 8 during a power interruption which might occur during a low battery state.

When the master ON/OFF switch means 88 is moved to its OFF position (the position shown in FIG. 5), the switch element 14 is opened and the switch element 86 is placed or maintained in the position shown in FIG. 5 because there is no internal voltage energizing the electronic circuits of the present invention.

Figure 9:
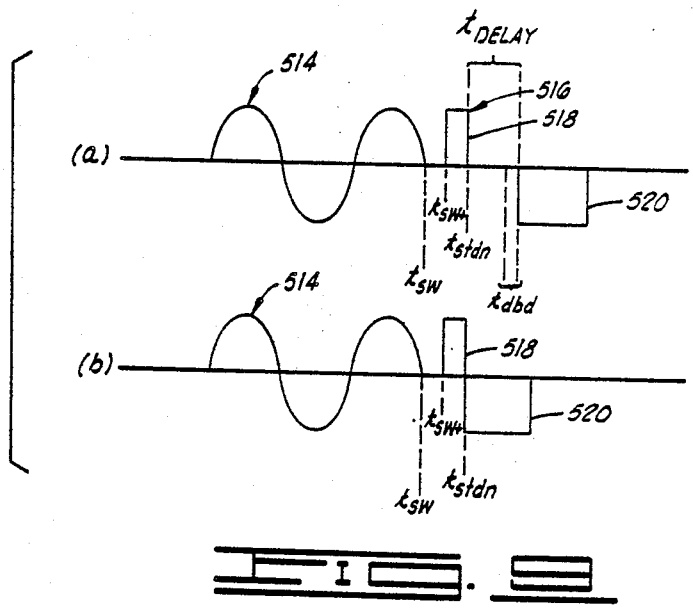
FIG. 9 illustrates in part (a) a power signal which has not been adjusted by the improvement of the present invention and in part (b) a power signal which has been adjusted by the improvement of the present invention.

Referring to FIG. 9, the operation of the phase switching means 506 will be described. It is to be noted that the waveforms shown in FIG. 9 are not intended to be representations of actual waveforms and are not drawn to any particular absolute or relative scale. Rather, the illustrated waveforms are simply selected representations used for purposes of explaining the operation of the preferred embodiment of the present invention.

Part (a) of FIG. 9 shows schematic representations of a power signal provided to a load. The power signal includes a line signal 514 provided by the primary power supply 8 up to a switchover time and an inverter output, or auxiliary power, signal 516 provided by the power amplifier shown in FIG. 4C after the switchover time. The FIG. 9(a) waveform 516 is a representation of the auxiliary power signal which would occur during a phase imbalance at switchover without the implementation of the phase switching means 506. As drawn in FIG. 9(a), the line voltage 514 terminates at time $t_{sw}$ when the switch means 4 is opened and a switchover occurs due to, for example, a failure or brown-out of the signal 514 as detected by the monitoring portions of the present invention. Upon switchover, an upwardly extending pulse 518 of the signal 516 is shown to have been generated at a time $t_{sw+}$. The polarity of the pulse 518 depends upon the state of the toggle means 502, which state has been chosen to be such as to generate the pulse 518 with a positive polarity for the present example. Because this upwardly extending pulse 518 has the same polarity as the last portion of the signal 514 immediately prior to $t_{sw}$, a phase imbalance (or, more specifically, flux imbalance) can occur as a result of the positive-polarity pulse 518 immediately following the positive portion of the last cycle of the terminated signal 514. This imbalance, as indicated by the current flowing through the driven portion of the winding 28 and the resistor 68, is detected by the comparator 500 sensing the corresponding voltage drop across the resistor 68, which comparator upon such detection generates a shutdown signal and terminates, via the circuit shown in FIG. 8, the positive polarity pulse at time $t_{stdn}$. Without the phase switching means 506, the termination of the positive polarity pulse 518 increases the normal delay or deadband, which deadband normally occurs between the positive pulse 518 and a negative polarity pulse 520 of the signal 516 as a result of the second state of each cycle of the signal from the oscillator 504 and any pulse width modulation which otherwise occurs through operation of the present invention, by the amount of time the positive polarity pulse 518 has been terminated. An exemplary deadband portion is indicated in FIG. 9(a) by $t_{dbd}$ and the overall delay period between the two pulses 518, 520 is indicated by $t_{delay}$.

If $t_{delay}$ is of a sufficient length as might occur in worst-case conditions, the interruption in the auxiliary power signal 516 during this time after switchover might be detrimental to operation of the computer 10 which is to be powered, in the illustrated embodiment, by the present invention after switchover. This potential problem is prevented from occurring by the addition of the phase switching means 506. Part (b) of FIG. 9 illustrates how the present invention eliminates $t_{delay}$ from the example shown in part (a) of FIG. 9.

In FIG. 9(b), the voltage signal 514 is terminated at $t_{sw}$ as in the FIG. 9(a) example. At time $t_{sw+}$, the positive polarity pulse 518 of the signal 516 is generated, and at the shutdown time, $t_{stdn}$, the positive polarity pulse 518 is terminated. This termination occurs, as in the FIG. 9(a) example, as a result of the shutdown signal provided at the output of the current sensing comparator 500. In the present invention, to which the FIG. 9(b) example applies, this signal is connected to the synchronizing input of the integrated circuit 56 through the phase switching means 506 so that the shutdown pulse effectively overrides the oscillator signal generated by the oscillator 504. In the preferred embodiment, the shutdown pulse from the comparator 500 is a low logic level pulse. This pulse immediately toggles the toggle means 502 to switch from the output A or B causing the positive polarity pulse 518 to be generated to the opposite output B or A which will enable the power amplifier means shown in FIG. 4C to generate the voltage pulse 520 in the negative polarity direction. This low pulse also causes the oscillator 504 to immediately commence a new timing sequence so that the deadband period, $t_{dbd}$, is not encountered until at least after the negative pulse 520 has been maintained for the appropriate duration established by the operation of the present invention. Toggling of the toggle means 502, and the outputs A and B controlled thereby, causes the shutdown signal to be terminated so that the outputs A and B are immediately enabled.

This function of the phase switching means 506 can be achieved by the diode 508 alone. However, to limit this corrective action to a predetermined number of cycles following switchover so that oscillation does not occur under overload or shortcircuit conditions, the capacitor 510 is added in electrical series with the diode 508. The value of the capacitor 510 can be selected so that in combination with the leakage impedance of the diode 508, a suitable discharge time of the capacitor is selected which will enable the capacitor 510 to discharge within, for example, three pulses of the signal 516. To better control this timing, the resistor 512 can be added in parallel to the diode 508.

As shown in FIG. 4B, the shutdown output of the integrated circuit 56 is also connected through the phase switching means 506 to the reset input of the integrated circuit 56, thereby insuring substantially instantaneous starting of the opposite polarity pulse when a shutdown condition is detected.

Although in the example illustrated in FIG. 9(b) the phase switching occurs substantially instantaneously, under certain conditions, there may be some minimal delay in the switchover; however, this delay is substantially less than the delay exhibited in the FIG. 9(a) example. Therefore, "instantaneously" or "immediately" or the like as used herein with reference to the phase switching means 506 is not limited to mean at an identical coincidence in time, but includes minimal time periods, such as of the order of fifty microseconds in the preferred embodiment.

Thus, the present invention is well adapted to carry out the objects and attain the ends and advantages mentioned above as well as those inherent therein. While a preferred embodiment of the invention has been described for the purpose of this disclosure, numerous changes in the construction and arrangement of parts can be made by those skilled in the art, which changes are encompassed within the spirit of this invention as defined by the appended claims.

What is claimed is:

1. A power source apparatus for adjusting the phase relationship between a first power signal, cyclically alternating between at least two polarities, provided to a load at a first time and a second power signal, cyclically alternating between at least two polarities, provided to the load at a second time, comprising:

power signal generating means for generating said second power signal so that each cycle thereof normally has a first position with a first polarity, a second portion with a second polarity, a third portion with a neutral polarity occurring between said first and second portions, and a fourth portion with a neutral polarity occurring after said second portion;

means for disconnecting said first power signal from said load between said first time and said second time;

phase imbalance detecting means for detecting a phase imbalance between the phase of said first power signal at said first time and the phase of said second power signal at said second time; and phase switching means, responsive to said phase imbalance detecting means, for terminating the one of said first portion and said second portion occurring at said second time and for causing said generating means to generate the other one of said first portion and said second portion without first generating said third portion or said fourth portion.

2. The power source apparatus of claim 1, wherein:

said power signal generating means includes:

oscillator means for providing a cyclical control signal having a predetermined period;

toggle means, responsive to said control signal, for alternately providing a first power control signal and a second power control signal during alternate cycles of said control signal; and power amplifier means for providing a first voltage output pulse having said first polarity in response to said first power control signal and for providing a second voltage output pulse having said second polarity in response to said second power control signal;

said phase imbalance detecting means includes sensing means for sensing a flux imbalance by a current flowing in said power amplifier means; and said phase switching means includes connecting means for connecting said sensing means to said oscillator means so that said sensing means restarts said control signal of said oscillator means and toggles said toggle means to provide the other one of said first and second power control signals when a phase imbalance is detected.

3. The power source apparatus of claim 2, wherein:

said oscillator means has an output through which said control signal is provided;

sand sensing means has an output; and said connecting means includes diode means for providing a directional current flow path between the output of said oscillator means and the output of said sensing means.

4. A power source apparatus for adjusting the phase relationship between a first power signal, cyclically alternating between at least two polarities, provided to a load at a first time and a second power signal, cyclically alternating between at least two polarities, provided to the load at a second time, comprising:

power signal generating means for generating said second power signal so that each cycle thereof normally has a first portion with a first polarity, a second portion with a second polarity, a third portion with a neutral polarity occurring between said first and second portions, and a fourth portion with a neutral polarity occurring after said second portion, said power signal generating means including:
  oscillator means for providing a cyclical control signal having a predetermined period, said oscillator means having an output through which said control signal is provided;
  toggle means, responsive to said control signal, for alternately providing a first power control signal and a second power control signal during alternate cycles of said control signal; and
  power amplifier means for providing a first voltage output pulse having said first polarity in response to said first power control signal and for providing a second voltage output pulse having said second polarity in response to said second power control signal;

means for disconnecting said first power signal from said load between said first time and said second time;

phase imbalance detecting means for detecting a phase imbalance between the phase of said first power signal at said first time and the phase of said second power signal at said second time, said phase imbalance detecting means including sensing means for sensing a flux imbalance by a current flowing in said power amplifier means, said sensing means having an output; and phase switching means, responsive to said phase imbalance detecting means, for terminating the one of said first portion and said second portion occurring at said second time and for causing said generating means to generate the other one of said first portion and said second portion without first generating said third portion or said fourth portion, said phase switching means including connecting means for connecting said sensing means to said oscillator means so that said sensing means restarts said control signal of said oscillator means and toggles said toggle means to provide the other one of said first and second power control signals when a phase imbalance is detected, said connecting means including diode means for providing a directional current flow path between the output of said oscillator means and the output of said sensing means, said connecting means further including capacitor means connected in electrical series with said diode means between the output of said oscillator means and the output of said sensing means.

5. A power source apparatus for correcting a flux imbalance created by a primary voltage signal and an auxiliary voltage signal during a switchover between a primary alternating current voltage source and an auxiliary alternating current voltage source, said apparatus comprising:

means for generating said auxiliary voltage signal, including:
  power amplifier means for providing voltage pulses; and
  switching means for controlling said power amplifier means to alternately provide said voltage pulses at different polarities, said switching means including timing means for providing a timing signal defining a predetermined time period by which the commencement of a voltage pulse at a first polarity is temporally separated from the commencement of a voltage pulse at a second polarity;

comparator means for comparing voltage inputs corresponding to a current flowing through said power amplifier means and for providing a control signal when said voltage inputs indicate the current is tending to saturate said power amplifier means; and connecting means for connecting said control signal to said timing means so that said switching means operates said power amplifier means to immediately provide a voltage pulse having a polarity different from the polarity of the voltage pulse generated immediately after said switchover and so that said control signal resets said timing means.

6. A power source apparatus for correcting a flux imbalance created by a primary voltage signal and an auxiliary voltage signal during a switchover between a primary alternating current voltage source and an auxiliary alternating current voltage source, said apparatus comprising:

means for generating said auxiliary voltage signal, including:
  power amplifier means for providing voltage pulses; and
  switching means for controlling said power amplifier means to alternately provide said voltage pulses at different polarities, said switching means including timing means for providing a timing signal defining a predetermined time period by which the commencement of a voltage pulse at a first polarity is temporally separated from the commencement of a voltage pulse at a second polarity;

comparator means for comparing voltage inputs corresponding to a current flowing through said power amplifier means and for providing a control signal when said voltage inputs indicate the current is tending to saturate said power amplifier means; and connecting means for connecting said control signal to said timing means so that said switching means operates said power amplifier means to immediately provide a voltage pulse having a polarity different from the polarity of the voltage pulse generated immediately after said switchover and so that said control signal resets said timing means, said connecting means including limiting means, connected between said timing means and said comparator means, for controlling the number of times said control signal is provided.

7. The power source apparatus of claim 6, wherein said limiting means includes:
  capacitive means; and resistive means for connecting said capacitive means in electrical series therewith between said timing means and said comparator means.

8. The power source apparatus of claim 7, wherein said resistive means includes a diode.

9. A power source apparatus for switching from a first electrical output drive to a second electrical output drive, comprising:
   pulse width modulation means for providing said first electrical output drive and said second electrical output drive, said pulse width modulation means including:
      first output means for providing a first power control signal;
      second output means for providing a second power control signal;
      oscillator means for repetitively providing a cyclical first switching control signal having, within each cycle, a first state during a first predetermined time period and a second state during a second predetermined time period;
      toggle means, connected to said oscillator means for receiving said first switching control signal so that said first switching control signal enables said toggle means during each said first predetermined time period and disables said toggle means during each said second predetermined time period, for alternately actuating said first and second output means to alternately provide said first and second power control signals in response to successive occurrences of said first state of said first switching control signal and for disabling said first and second output means in response to each occurrence of said second state of said first switching control signal so that there is a polarity interruption time period defined between successive ones of said first and second power control signals; and
      current sensing means for providing a second switching control signal when a detected power signal indicates a flux imbalance during successive polarity periods; and
   connector means for connecting said current sensing means to said oscillator means and said toggle means to switch said toggle means and simultaneously restart said first switching control signal so that an immediate toggle between alternate ones of said first and second output means occurs without an intervening polarity interruption time period.

10. A power source apparatus for switching from a first electrical output drive to a second electrical output drive, comprising:
   pulse width modulation means for providing said first electrical output drive and said second electrical output drive, said pulse width modulation means including:
      first output means for providing a first power control signal;
      second output means for providing a second power control signal;
      oscillator means for repetitively providing a cyclical first switching control signal having, within each cycle, a first state during a first predetermined time period and a second state during a second predetermined time period;
      toggle means, connected to said oscillator means for receiving said first switching control signal so that said first switching control signal enables said toggle means during each said first predetermined time period and disables said toggle means during each said second predetermined time period, for alternately actuating said first and second output means to alternately provide said first and second power control signals in response to successive occurrences of said first state of said first switching control signal and for disabling said first and second output means in response to each occurrence of said second state of said first switching control signal so that there is a polarity interruption time period defined between successive ones of said first and second power control signals; and
      current sensing means for providing a second switching control signal when a detected power signal indicates a flux imbalance during successive polarity periods; and
   connector means for connecting said current sensing means to said oscillator means and said toggle means to switch said toggle means and simultaneously restart said first switching control signal so that an immediate toggle between alternate ones of said first and second output means occurs without an intervening polarity interruption time period, said connector means including:
      diode means connected between said current sensing means and said oscillator means; and
      capacitor means connected between said current sensing means and said oscillator means in electrical series with said diode means.

11. The power source apparatus of claim 10, wherein said connector means further includes resistor means connected in electrical parallel with said diode means.

12. An improved alternating current power source for use with an electrical load which is connectible to a primary power source through an electrical transmission system, said alternating current power source comprising:
   switch means, connectible with said electrical transmission system between said primary power source and said load, for opening and closing an electrical circuit provided between said primary power source and said load by said electrical transmission system;
   amplifier means for providing a transformer driving signal;
   transformer means having a first winding and a second winding, said first winding electrically connectible to said electrical transmission system between said switch means and said load so that a primary alternating current voltage signal from said primary power source appears across said first winding when said switch means closes said electrical circuit and said first winding is connected to said electrical transmission system, and said second winding electrically connected to said amplifier means so that said transformer driving signal creates an auxiliary alternating current voltage signal across said first winding when said switch means opens said electrical circuit;
   monitoring means for monitoring said primary alternating current voltage signal and said auxiliary alternating current voltage signal;
   pulse width modulation means, including a first input connected to said monitor means and including a first output connected to said amplifier means, for providing a pulse width modulated signal through said output to said amplifier means in response to said monitoring means, said pulse width modulation means further including:

a second input;

a second output;

sensing means, connected to said transformer means and to said second output, for sensing a phase-switching condition, wherein said primary alternating current voltage signal and said auxiliary alternating current voltage signal provide a current which tends to saturate said transformer means, and for providing a phase-switching control signal to said second output when said phase-switching condition is sensed;

toggle means, having a toggle input and having toggled outputs connected to said amplifier means, for operating said amplifier means so that said transformer driving signal alternates between two polarities; and oscillator means, having a oscillator output connected to said toggle input and to said second input, for providing an actuating signal to said toggle means; and diode means for connecting said second input with said second output so that said phase-switching control signal overrides said actuating signal.

13. The power source of claim 12, further comprising capacitor means connected in electrical series with said diode means.

14. The power source of claim 13, further comprising resistor means connected in electrical parallel with said diode means.

* * * * *

UNITED STATES PATENT AND TRADEMARK OFFICE
CERTIFICATE OF CORRECTION

PATENT NO. : 4,703,192
DATED : October 27, 1987
INVENTOR(S) : Frank T. Ferguson

It is certified that error appears in the above–identified patent and that said Letters Patent are hereby corrected as shown below:

Column 11, line 25, change "condition" to --conduction--.

Signed and Sealed this

Twenty-sixth Day of April, 1988

*Attest:*

DONALD J. QUIGG

*Attesting Officer*      *Commissioner of Patents and Trademarks*